(12) United States Patent
Titus et al.

(10) Patent No.: US 10,351,183 B2
(45) Date of Patent: Jul. 16, 2019

(54) SIDE SPLITTER, SPLITTER ASSEMBLY AND METHOD OF IMPROVING STABILITY AND PEAK CORNERING SPEED OF A MOTOR VEHICLE

(71) Applicant: FORD GLOBAL TECHNOLOGIES, LLC, Dearborn, MI (US)

(72) Inventors: Matthew Arthur Titus, Livonia, MI (US); Andrew Thomas Cunningham, Royal Oak, MI (US); Michael Stephen Sylvester, Berkley, MI (US); Thomas Joseph Ciccone, Madison Heights, MI (US); Peter Thai, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/489,156

(22) Filed: Apr. 17, 2017

(65) Prior Publication Data

US 2018/0297648 A1    Oct. 18, 2018

(51) Int. Cl.
*B62D 35/00*     (2006.01)
*B62D 37/02*     (2006.01)

(52) U.S. Cl.
CPC .......... *B62D 35/008* (2013.01); *B62D 35/005* (2013.01); *B62D 37/02* (2013.01)

(58) Field of Classification Search
CPC ..... B62D 35/008; B62D 35/005; B62D 37/02
See application file for complete search history.

(56) References Cited

U.S. PATENT DOCUMENTS

| | | | |
|---|---|---|---|
| 6,712,425 B2 | 3/2004 | Brulhart | |
| 8,297,685 B2 | 10/2012 | Wolf et al. | |
| 8,523,270 B2 | 9/2013 | Marlier et al. | |
| 9,327,775 B1 | 5/2016 | Guenzel | |
| 9,573,634 B2 | 2/2017 | Ohira et al. | |
| 9,669,885 B1 * | 6/2017 | Fahland | B62D 37/02 |
| 2015/0079891 A1 | 3/2015 | Weiss et al. | |
| 2016/0339970 A1 * | 11/2016 | Shibutake | B62D 35/005 |
| 2017/0144636 A1 | 5/2017 | Schmidt et al. | |

FOREIGN PATENT DOCUMENTS

| | | |
|---|---|---|
| JP | 2007015482 A | 1/2007 |
| JP | 2016150741 A | 8/2016 |
| KR | 101218083 B1 | 1/2013 |

OTHER PUBLICATIONS

English Machine Translation of JP2007015482A.
English Machine Translation of JP2016150741A.
English Machine Translation of KR101218083B1.
Office Action dated Jul. 27, 2018 for U.S. Appl. No. 15/489,248, filed Apr. 17, 2017.

* cited by examiner

*Primary Examiner* — D Glenn Dayoan
*Assistant Examiner* — Melissa A Black
(74) *Attorney, Agent, or Firm* — Jason Rogers; Vichit Chea; King & Schickli, PLLC (57) ABSTRACT

A front splitter assembly includes a front splitter having a first end and a second end, a first side splitter at the first end and a second side splitter at the second end. Each side splitter includes a contoured body. In one embodiment each side splitter includes an underwing extending between the extension section and the wicker section inboard of the end plate of the side splitter. A related method of improving stability and peak cornering speed of a motor vehicle is also provided.

16 Claims, 10 Drawing Sheets

SIDE SPLITTER, SPLITTER ASSEMBLY AND METHOD OF IMPROVING STABILITY AND PEAK CORNERING SPEED OF A MOTOR VEHICLE

TECHNICAL FIELD

This document relates generally to the motor vehicle equipment field and, more particularly, to a new and improved side splitter, a new and improved splitter assembly and a new and improved method of improving stability and peak cornering speed of a motor vehicle.

BACKGROUND

When a high performance motor vehicle is at a dynamic curb ride height, high pressure regions are generated on tire surfaces exposed to free-stream airflow. These include but are not necessarily limited to surfaces outboard of the front bumper fascia and below the underbody forward of the tire. These high pressure regions generate a positive lifting force acting upon the motor vehicle.

When the motor vehicle experiences a forward pitch through braking, throttle reduction and/or road inputs, the front nose or splitter of the performance vehicle moves toward the ground, increasing negative lift ("downforce"). The resulting rapid change in front tire grip in proportion to rear tire grip results in a phenomena of high pitch sensitivity that reduces vehicle stability, driver confidence and peak cornering speed.

Rapid changes in front tire grip may also be experienced at other times. For example, when a high performance motor vehicle is traveling in a direction different than its longitudinal axis ("yaw"), an increase in vehicle lift is experienced. More specifically, when the free stream air travels at an angle with respect to the longitudinal axis over the fascia, hood and other body components and into the wheel wells, lift is generated. The net effect is reduced vehicle stability, reduced driver confidence and reduced peak cornering speed.

This document relates to a new and improved side splitter, a new and improved splitter assembly and a new and improved method for improving stability and peak cornering speed of a motor vehicle.

SUMMARY

In accordance with the purposes and benefits described herein, a new and improved side splitter is provided for a motor vehicle. That side splitter comprises a contoured body including an extension section and a wicker section defining a first included angle of between 75 and 105 degrees. The wicker section may extend upwardly and rearwardly from the extension section. Further, the wicker section may narrow from a first end adjacent the extension section toward a second, opposite end. In addition, the wicker section may include an end plate. The end plate may project forward from a front face of the wicker section.

In some embodiments, the side splitter may include an underwing extending between the extension section and the wicker section inboard of the end plate. The underwing may form a second included angle of between 0.1 and 20 degrees with respect to the extension section and a third included angle of between 90 degrees and 135 degrees with respect to the wicker section. Further, the end plate and the front face of the wicker section may form a fourth included angle of between 75 degrees and 115 degrees.

In accordance with an additional aspect, a splitter assembly is provided for a motor vehicle. That splitter assembly comprises a front splitter having a first end and a second end, a first side splitter at the first end and a second side splitter at the second end wherein the first side splitter includes a first contoured body and the second side splitter includes a second contoured body.

The first contoured body may include an extension section and a wicker section defining a first included angle of between 75 and 105 degrees. The wicker section may extend upwardly and rearwardly from the extension section. Further, the wicker section may narrow from a first end adjacent the extension section toward a second, opposite end.

Still further, the wicker section may include an end plate. The end plate may project forward from a front face of the wicker section. In addition, in some embodiments the splitter assembly may include an underwing extending between the extension section and the wicker section inboard of the end plate.

Still further, the underwing may form a second included angle of between 0.1 and 20 degrees with respect to the extension section and a third included angle of between 90 and 135 degrees with respect to the wicker section. Further, the outer lip and the front face of the wicker section may form a fourth included angle of between 75 and 115 degrees.

The second side splitter may be a mirror image of the first side splitter.

In accordance with still another aspect, a method is provided of improving stability and peak cornering speed of a motor vehicle. That method comprises the steps of adding a first side splitter to a first end of a front splitter and adding a second side splitter to a second end of the front splitter. The method may further include the steps of extending the front splitter beyond a fascia of the motor vehicle at the first end and the second end and providing a first wicker section extending upward and rearward at the first end and a second wicker section extending upward and rearward at the second end.

Further, the method may include the steps of extending the first wicker section from the first end to a first front wheel opening and extending the second wicker section from the second end to a second front wheel opening. In addition, the method may include the steps of providing a first underwing at a first face of the first wicker section and providing a second underwing at a second face of the second wicker section.

In the following description, there are shown and described several preferred embodiments of the side splitter, splitter assembly and the related method of improving stability and peak cornering speed of a motor vehicle. As it should be realized, the side splitter, splitter assembly and related method are capable of other, different embodiments and their several details are capable of modification in various, obvious aspects all without departing from the side splitter, splitter assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the side splitter, splitter assembly and the method of improving stability and peak cornering speed of a motor vehicle and together with the description serve to explain certain principles thereof.

FIG. 3b is a detailed side elevational view of the side splitter illustrated in FIG. 3a.

FIG. 4b is a side elevational view of the side splitter illustrated in FIG. 4a.

Reference will now be made in detail to the present preferred embodiments of the side splitter and the splitter assembly, examples of which are illustrated in the accompanying drawing figures.

DETAILED DESCRIPTION

Figure 1:
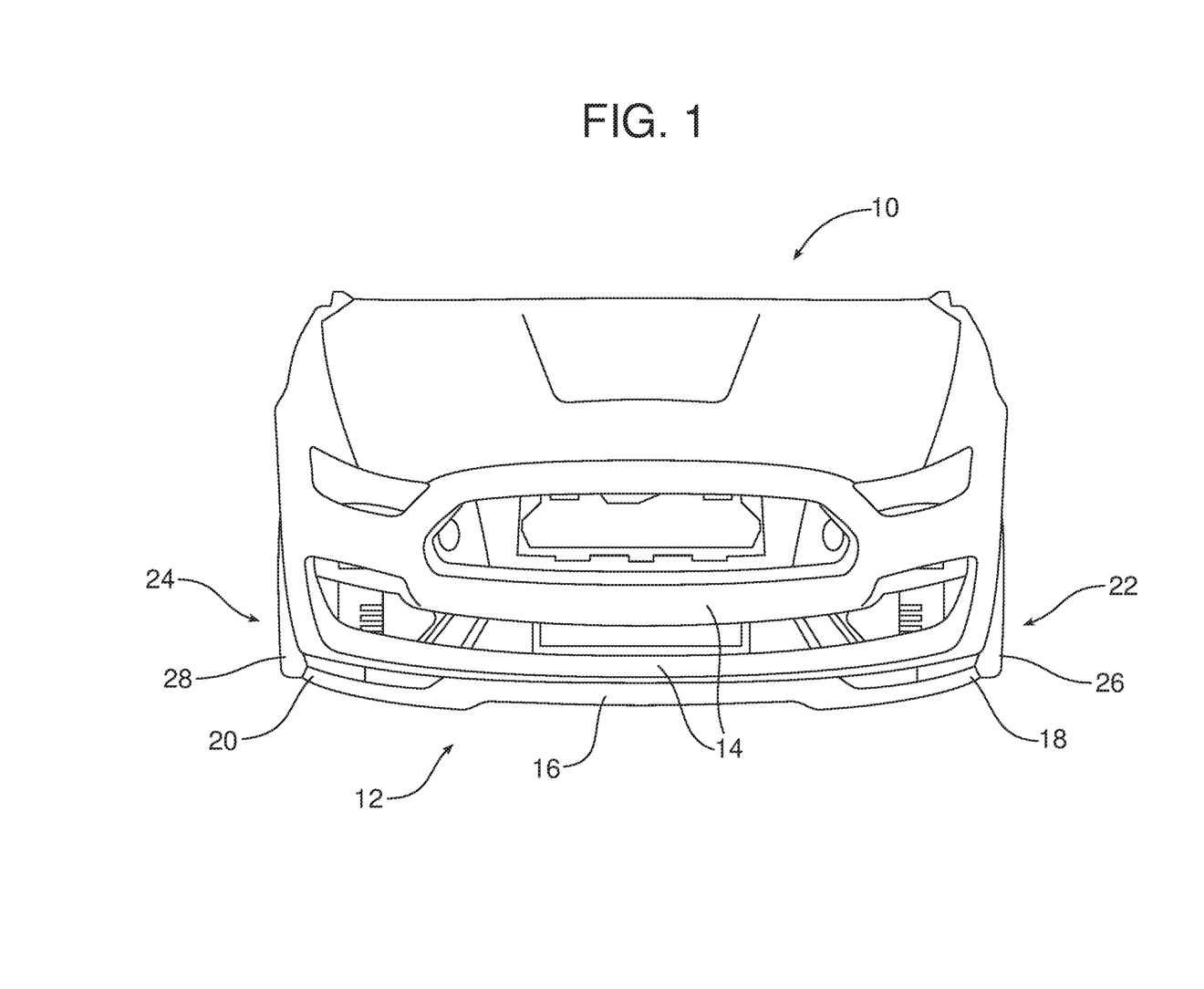
FIG. 1 is a front elevational view of a motor vehicle equipped with the new and improved splitter assembly.
Figure 2A:
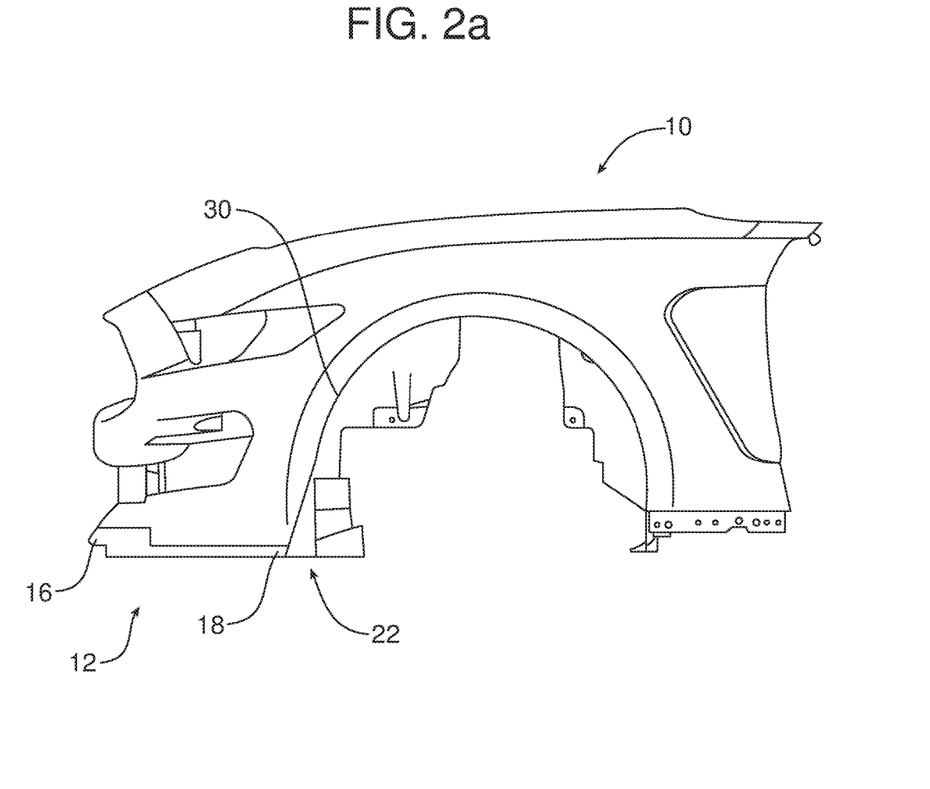
FIG. 2a is an end elevational view of a first side splitter of the splitter assembly illustrated in FIG. 1.
Figure 2B:
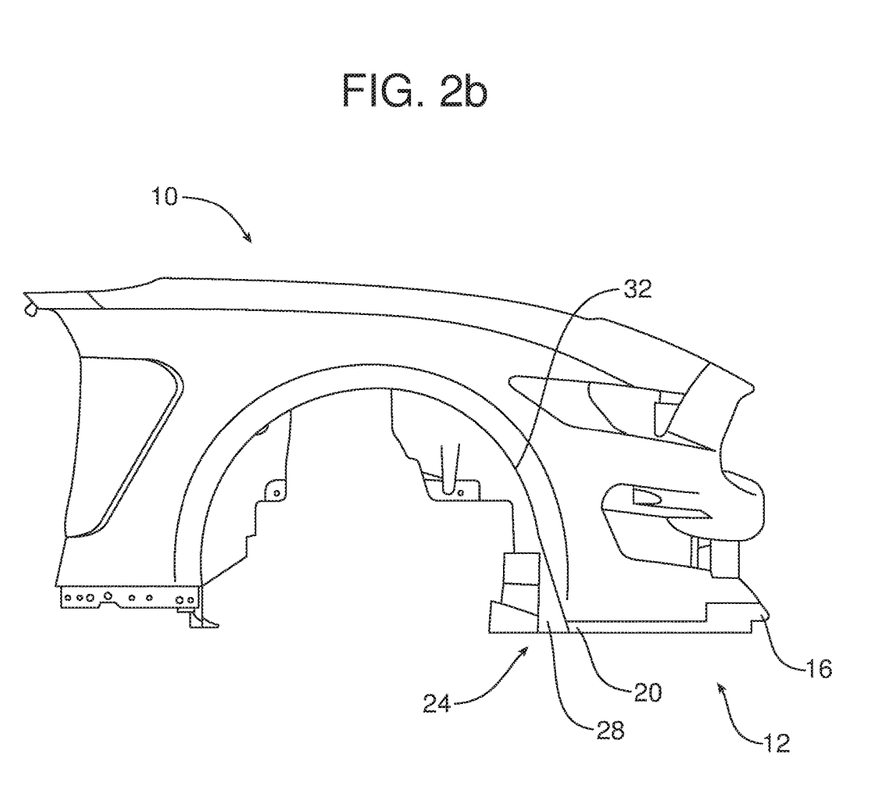
FIG. 2b is an end elevational view of a second side splitter at the opposite end of the splitter assembly.

Reference is now made to FIGS. 1, 2a and 2b illustrating a motor vehicle 10 equipped with the new and improved splitter assembly 12 outlining at least a portion of the front fascia 14 of the motor vehicle. More specifically, the splitter assembly 12 includes a front splitter 16 projecting downwardly from the front fascia 14. The front splitter 16 includes a first end 18 and a second end 20. A first side splitter 22 is provided at the first end 18 of the front splitter 16. A second side splitter 24 is provided at the second end 20 of the front splitter 16.

As illustrated, the first side splitter 22 includes a first contoured body 26 and the second side splitter 24 includes a second contoured body 28. As further illustrated in FIG. 2a, the first contoured body 26 of the first side splitter 22 extends from the first end 18 of the front splitter 16 to a first front wheel opening 30. Similarly, as illustrated in FIG. 2b, the second contoured body 28 of the second side splitter 24 extends from the second end 20 of the front splitter 16 to the second, opposite front wheel opening 32. As should also be appreciated from viewing FIG. 1, the first side splitter 22 and the second side splitter 24 extend beyond the fascia 14 of the motor vehicle 10.

Figure 3A:
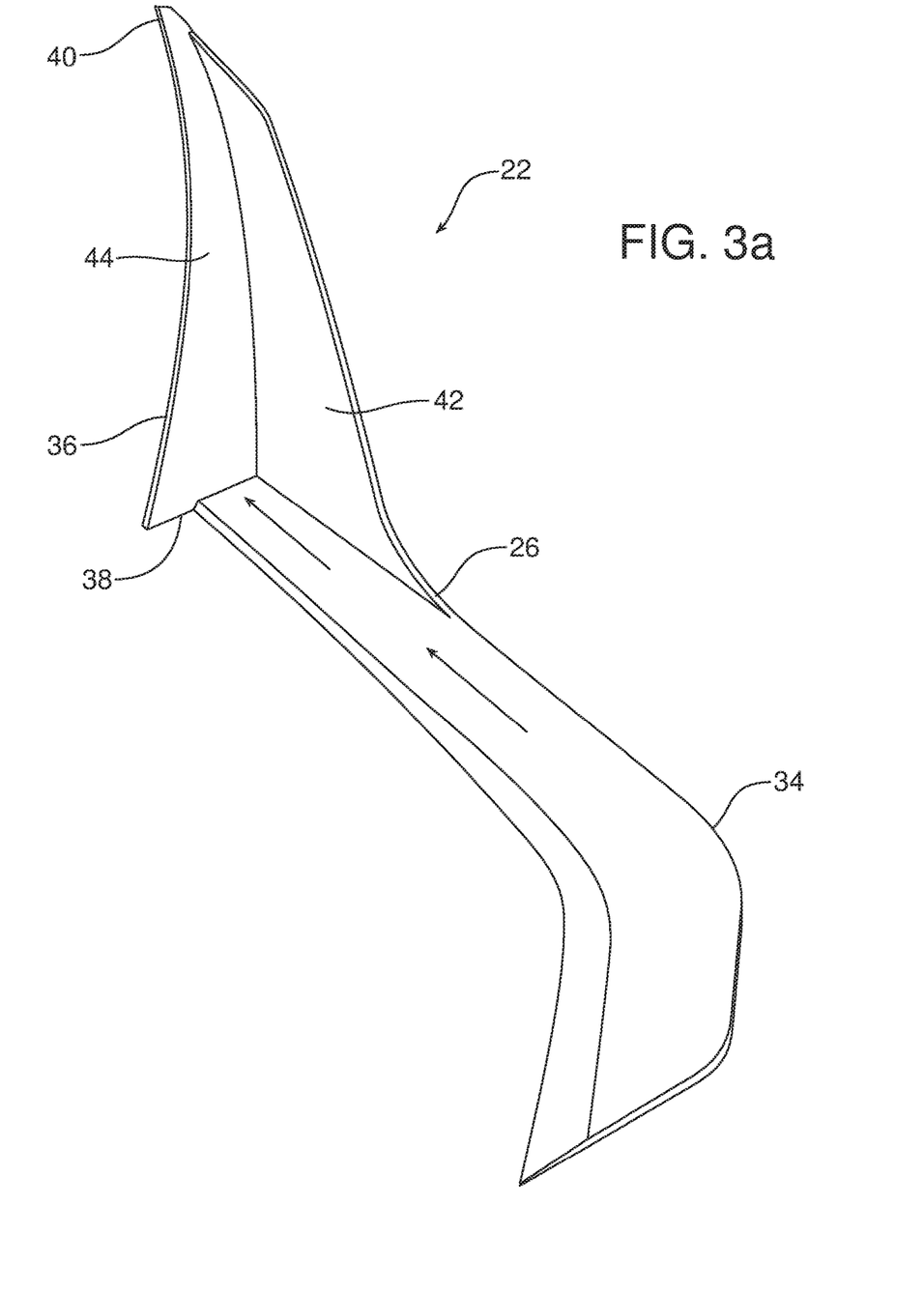
FIG. 3a is a detailed perspective view of the side splitter illustrated in FIG. 2.
Figure 3B:
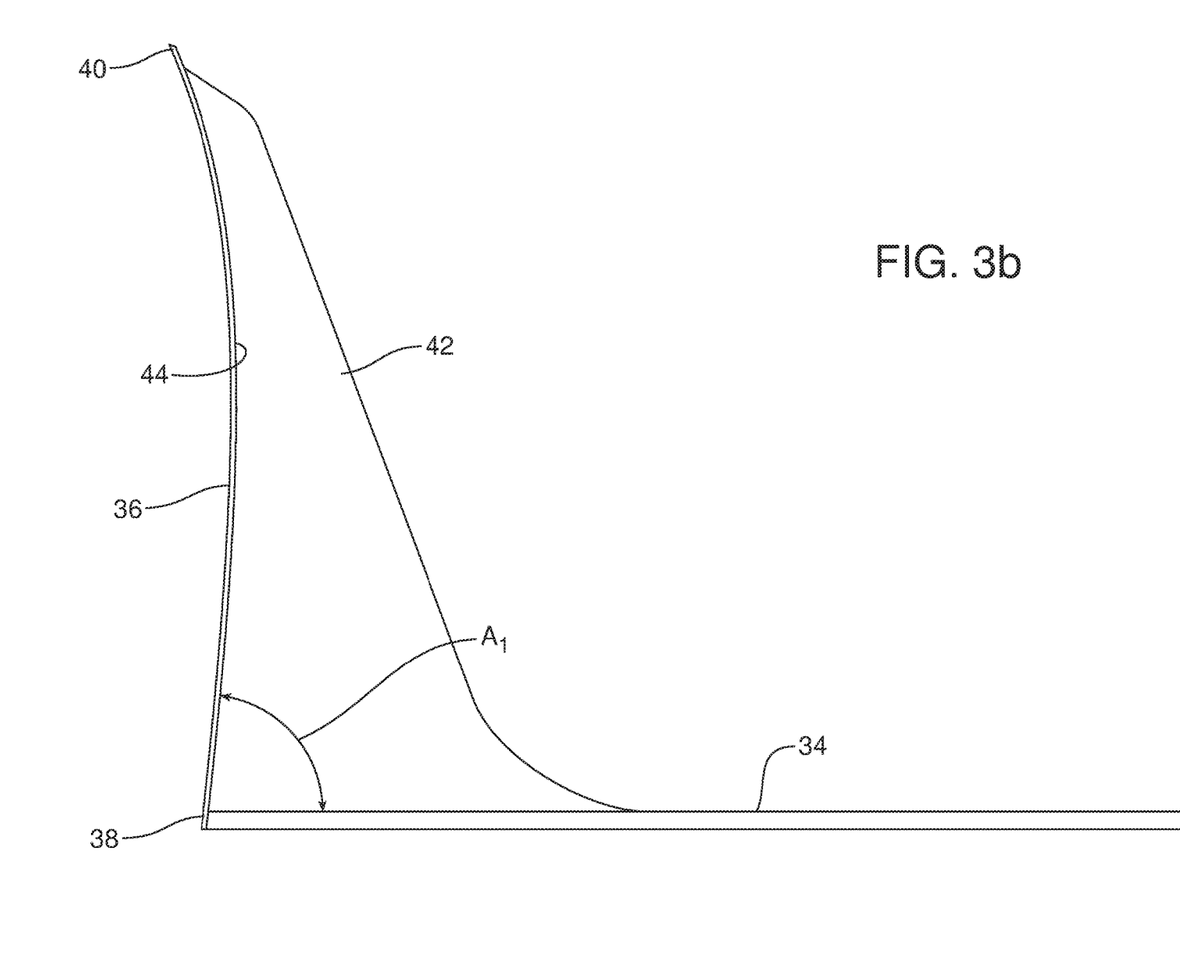

Reference is now made to FIGS. 3a-3b which illustrate the first contoured body 26 of the first side splitter 22 in detail. More specifically, the first contoured body 26 includes an extension section 34 and a wicker section 36. The extension section 34 and the wicker section 36 typically define a first included angle $A_1$ of between 75 and 105 degrees. In some embodiments the first included angle $A_1$ is between 80 and 100 degrees. In some embodiments the first included angle $A_1$ is between 85 and 95 degrees. In still other embodiments, the first included angle $A_1$ is approximately 90 degrees.

As illustrated in FIGS. 1-5, the wicker section 36 extends upwardly and outwardly from the extension section 34. In some but not all of embodiments, the wicker section 36 narrows from a first end 38 adjacent the extensions section 34 toward a second, opposite end 40.

As illustrated in FIGS. 1, 2a, 3a and 3b, the wicker section 36 includes an end plate 42. The end plate 42 projects forward from a front face 44 of the wicker section 36. Here it should be appreciated that the second side splitter 24 is a mirror image of the first side splitter 22 described above and illustrated in detail in FIGS. 3a-3c.

FIGS. 4a-4d illustrate an alternative embodiment of side splitter 46 including a contoured body 48 similar in most respects to the contoured body 26 described above. Thus, the contoured body 48 includes an extension section 50 and a wicker section 52 defining a first included angle of between 75 and 105 degrees or between 80 and 100 degrees, or between 85 and 95 degrees or approximately 90 degrees.

The wicker section 52 extends upwardly and rearwardly from the extension section 50. In some embodiments the wicker section 52 narrows from a third end 54 adjacent the extension section 50 to a fourth, opposite end 56.

Further, the wicker section 52 includes an end plate 58 that projects forward from a front face 60 of the wicker section 52. The end plate 58 may have a height H of between about 5 mm and 750 mm and a width W of between 5 mm and 200 mm. That width W may be constant or vary across the height H of the wicker section 52. This dimension could vary based upon fascia (bumper cover) location and how the splitter wicker is mounted.

In contrast to the first embodiment of the side splitter 22 illustrated in FIGS. 3a and 3b, the side splitter 46 illustrated in FIGS. 4a-4d includes an underwing 62, in the form of a wedge-shaped channel, extending between the extension section 50 and the wicker section 52 inboard the end plate 58. The underwing 62 may form a second included angle $A_2$ of between about 0.1 and 20 degrees with the extension section 50. In some embodiments the second included angle $A_2$ is between about 5 and 15 degrees. In some embodiments the second included angle $A_2$ is between about 10 and 15 degrees. In some embodiments the second included angle $A_2$ is about 10 degrees.

The underwing 62 may form a third included angle $A_3$ of between about 90 and 135 degrees with the wicker section 52. In some embodiments, the third included angle $A_3$ may be between about 95 and 130 degrees. In some embodiments the third included angle $A_3$ may be between about 95 and 115 degrees. In some embodiments the third included angle $A_3$ may be about 100 degrees.

The end plate 58 and the front face 60 of the wicker section 52 may form a fourth included angle $A_4$ of between about 75 and 115 degrees. In some embodiments, the fourth included angle $A_4$ is between about 80 and 110 degrees. In some embodiments, the fourth included angle $A_4$ is between about 85 and 105 degrees. In some embodiments, the fourth included angle $A_4$ is between about 85 and 95 degrees. In some embodiments, the fourth included angle $A_4$ is about 90 degrees. The end plate 42 and the front face 44 of the wicker section 36 of the side splitter 22 illustrated in FIGS. 3a and 3b may form a similar included angle.

The side splitter 46 illustrated in FIGS. 4a-4d is adapted to be provided at the first end 18 of the front splitter 16. A second side splitter adapted for the second end 20 of the front splitter would be a mirror image of the side splitter 46 illustrated in FIGS. 4a-4d.

Consistent with the above description, a method is provided of improving stability and peak cornering speed of a motor vehicle 10. That method may be broadly described as comprising the steps of adding a first side splitter 22 to a first end 18 of a front splitter 16 and adding a second side splitter 24 to a second end 20 of the front splitter.

As further illustrated in FIGS. 1, 2*a* and 2*b*, the method may further include the step of extending the front splitter beyond the front fascia 14 of the motor vehicle at the first end 18 and the second end 20 by means of the extension sections 34 of the first and second side splitters 22, 24. In addition, the method includes providing wicker sections 36 extending upward and rearward at the first and second ends 18, 20 of the front splitter 16.

Still further, the method includes extending the wicker sections 36 of the first side splitter 22 from the first end 18 of the front splitter 16 to the first front wheel opening 30 and the second wicker section of the second side splitter 24 from the second end 20 of the front fascia to the second front wheel opening 32.

Figure 4A:
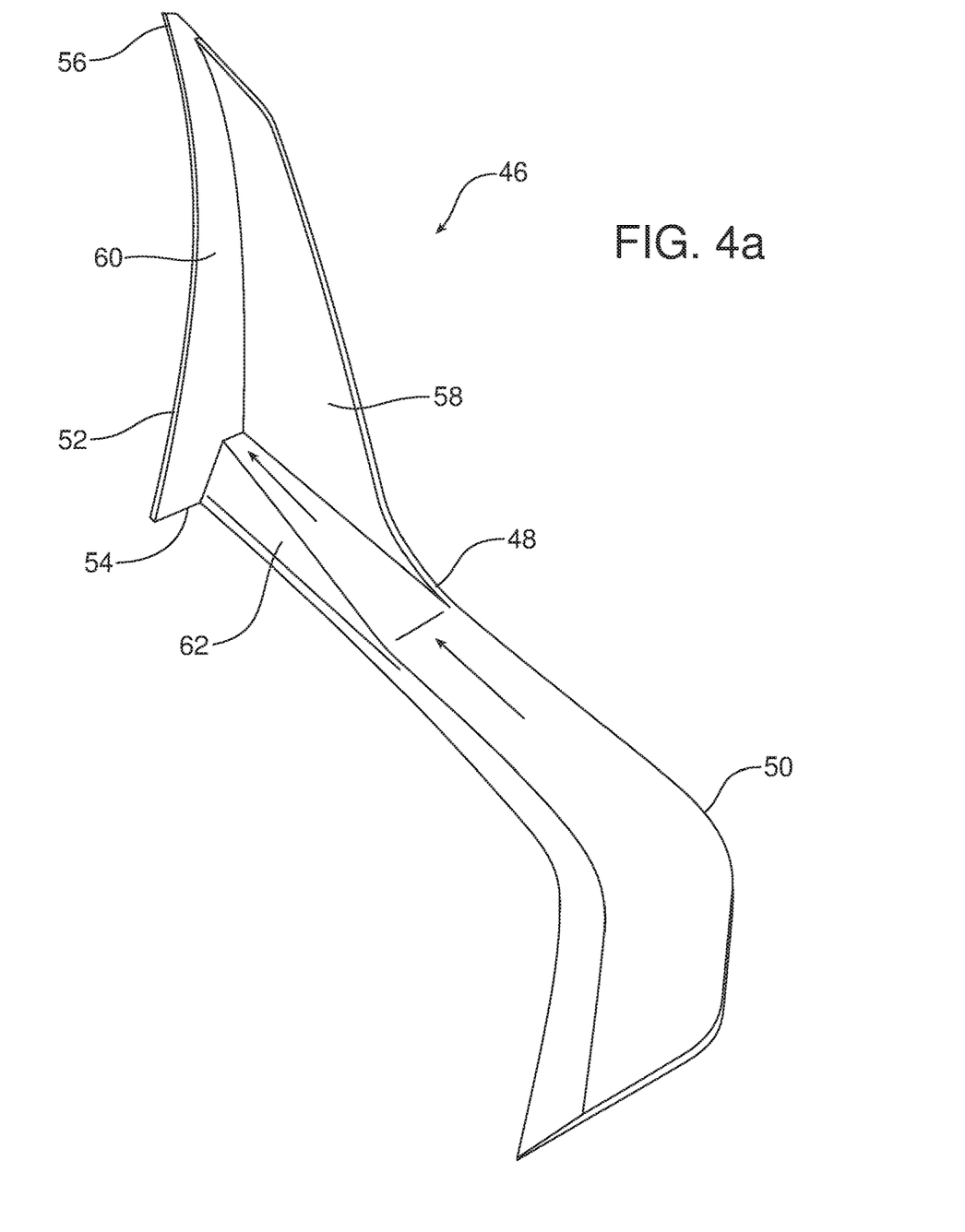
FIG. 4a is a perspective view of an alternative embodiment of a side splitter including an underwing.
Figure 4B:
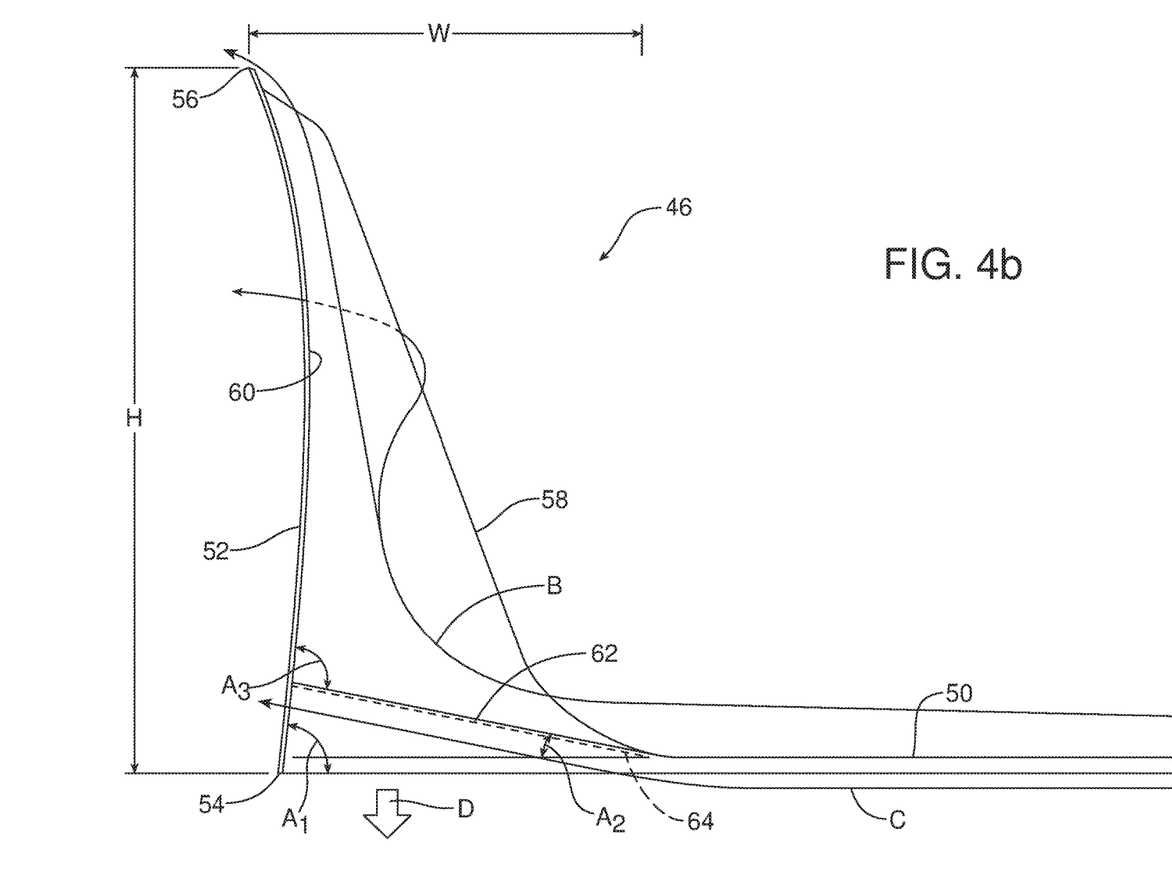
Figure 4C:
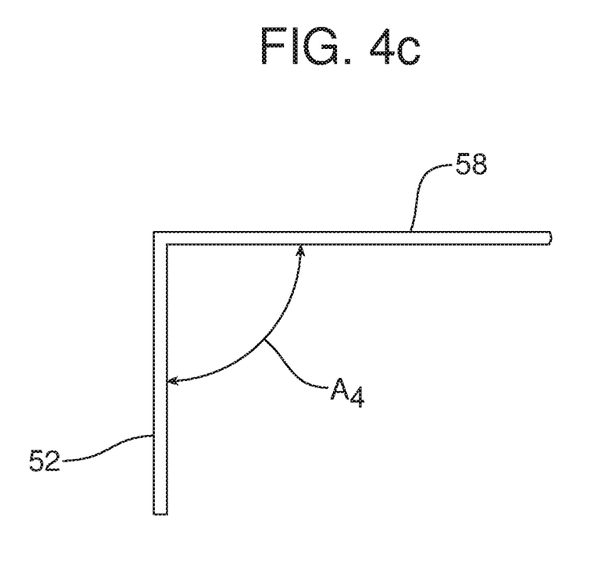
FIG. 4c is a top plan view of the side splitter illustrated in FIGS. 4a and 4b showing the included angle formed between the wicker surface and the end plate.
Figure 4D:
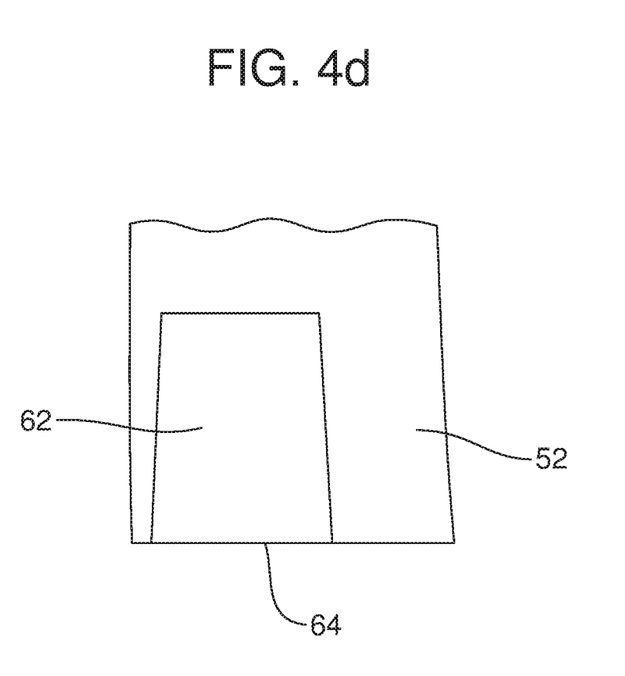
FIG. 4d is a detailed rear plan view illustrating the wedge-shaped channel of the underwing.

Still further, the method may include providing a first underwing 62 at a first base of the first wicker section 36 and providing a second underwing 62 at a second base of the second wicker section 52 of the second side splitter 46. FIG. 4*b* includes split action arrow B showing how the air stream flows over the side splitter 46 across the upper surface of the extension section 50, then upward over the underwing 62 and then upward again along the front face 60 of the wicker section 52. The forward projecting end plate 58 concentrates the air flow over the underwing 62 and the front face 60 while allowing some to spill around outboard of the end plate. The action arrow C illustrates the air flow along the undersurface of the side splitter 46 including through the wedge-shaped channel of the underwing 62 which allows the air to expand. This generates a low pressure area or zone beneath the starting edge 64 of the underwing 62 thereby creating desired downforce.

An underwing 62 located and extending between the extension section 50 and the wicker section 52 inboard of the end plate 58 and oriented at a desirable attack angle is particularly beneficial as it tends to increase production of downforce (note action arrow D) at negligible drag cost. Thus, it should be appreciated that such an underwing 62 improves cornering stability with negligible loss of straightaway speed when compared to a substantially identical side splitter not including the underwing.

Figure 5:
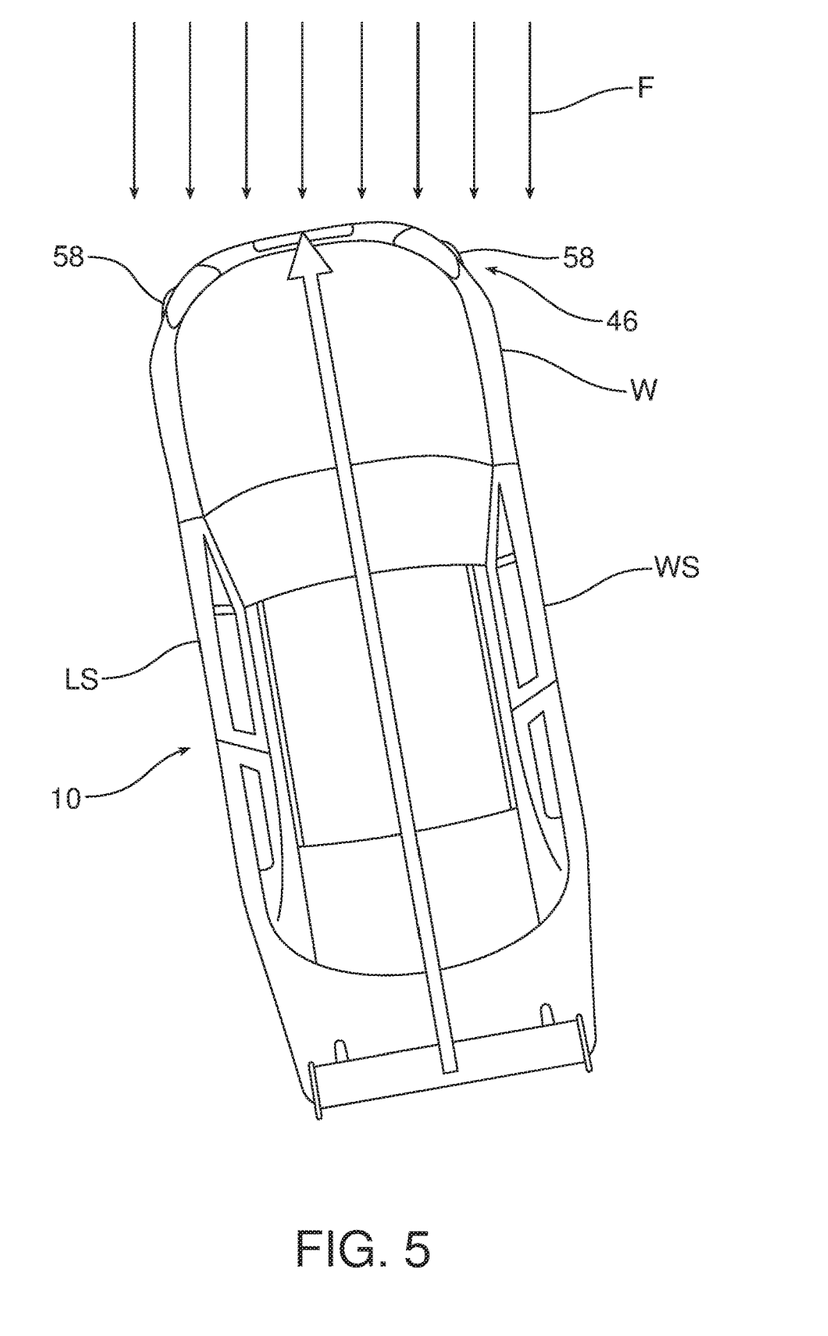
FIG. 5 is a top plan view of a motor vehicle illustrating yaw and wind flow.

In summary, the side splitter 22, 24, 46 provides a number of benefits and advantages. It projects outwardly and downwardly from the front fascia 14 reducing the exposure of the tires of the motor vehicle to free flow of air during cornering or even when the motor vehicle is at a yaw angle with respect to the longitudinal axis of the motor vehicle. As illustrated in FIG. 5, on the windward side WS, that is the side of the motor vehicle 10 incident to the free stream air F, the end plate 58 of the side splitter 46 reduces air flow into the wheel well W. On the leeward side LS, that is the side opposite the free stream air, the end plate 58 helps to stagnate the accelerated air flow wrapping around the fascia 14 and the bumper. Thus, increases in front lift are minimized, improving vehicle stability, driver confidence and peak cornering speed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A side splitter, comprising:
a contoured body including an extension section and a wicker section defining a first included angle of between 75 and 105 degrees adapted to improve stability and peak cornering speed of a motor vehicle, wherein said wicker section includes an end plate laterally outboard of the wicker section.

2. The side splitter of claim 1, wherein said wicker section extends upwardly and rearwardly from said extension section.

3. The side splitter of claim 2, wherein said wicker section narrows from a first end adjacent said extension section toward a second, opposite end.

4. The side splitter of claim 2, wherein said end plate projects forward from a front face of said wicker section.

5. The side splitter of claim 4, further including an underwing extending between said extension section and said wicker section inboard of said end plate.

6. The side splitter of claim 5, wherein said underwing forms a second included angle of between 0.1 and 20 degrees with said extension section and a third included angle of between 90 and 135 degrees with said wicker section.

7. The side splitter of claim 6, wherein said end plate and said front face of said wicker section form a fourth included angle of between 75 and 115 degrees.

8. A splitter assembly for a motor vehicle, comprising:
a front splitter having a first end and a second end;
a first side splitter at said first end; and
a second side splitter at said second end wherein said first side splitter includes a first contoured body and said second side splitter includes a second contoured body, wherein said first contoured body includes an extension section and a wicker section, and wherein said wicker section includes a front face and an end plate projecting forward from an entirety of the front face of said wicker section.

9. The splitter assembly of claim 8, wherein said extension section and said wicker section define a first included angle of between 75 and 105 degrees.

10. The splitter assembly claim 9, wherein said wicker section extends upwardly and rearwardly from said extension section.

11. The splitter assembly claim 10, wherein said wicker section narrows from a third end adjacent said extension section toward a fourth, opposite end.

12. The splitter assembly claim 10, wherein said end plate is laterally outboard of the wicker section.

13. The splitter assembly claim 12, further including an underwing extending between said extension section and said wicker section inboard of said end plate.

14. The splitter assembly claim 13, wherein said underwing forms a second included angle of between 0.1 and 20 degrees with said extension section and a third included angle of between 90 and 135 degrees with said wicker section.

15. The splitter assembly claim 14, wherein said end plate and said front face of said wicker section form a fourth included angle of between 75 and 115 degrees.

16. The splitter assembly claim 15, wherein said second side splitter is a mirror image of said first side splitter.

* * * * *